(12) United States Patent
Shin et al.

(10) Patent No.: US 6,424,741 B1
(45) Date of Patent: Jul. 23, 2002

(54) APPARATUS FOR ANALYZING IMAGE TEXTURE AND METHOD THEREFOR

(75) Inventors: Hyun-doo Shin, Sungnam; Yang-lim Choi, Suwon, both of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/272,321

(22) Filed: Mar. 19, 1999

(51) Int. Cl.[7] .............................. G06K 9/00; G06K 9/40
(52) U.S. Cl. ........................ 382/170; 382/260; 382/308; 345/582
(58) Field of Search ................................ 382/170, 173, 382/243, 203, 260–265, 270–273, 254, 108, 307–308; 345/582, 427, 428; 708/322, 300

(56) References Cited

U.S. PATENT DOCUMENTS

| | | | |
|---|---|---|---|
| 4,615,013 A | | 9/1986 | Yan et al. .................... 364/521 |
| 5,577,131 A | * | 11/1996 | Oddou ........................ 382/173 |
| 5,673,213 A | * | 9/1997 | Weigl .......................... 708/322 |
| 5,832,118 A | * | 11/1998 | Kim ............................. 382/170 |
| 6,285,801 B1 | * | 9/2001 | Mancuso et al. ........... 382/268 |

FOREIGN PATENT DOCUMENTS

JP           9-44653        2/1997       ............. G06T/5/20

* cited by examiner

*Primary Examiner*—Bhavesh Mehta
(74) *Attorney, Agent, or Firm*—Sughrue Mion, PLLC

(57) ABSTRACT

An apparatus for analyzing image texture information and a method therefor are provided. The apparatus for analyzing the image texture information includes a filtering unit for filtering a still image including a plurality of pixels of M rows×N columns with filters having different filtering coefficients, an X axis projector for calculating a gray level mean value of a row of N pixels, for each row, with respect to the filtered plurality of images, and a Y axis projector for calculating a gray level mean value of a column of M pixels, for each column, with respect to the filtered plurality of images. It is possible to describe the orientation and the periodicity of the texture in extracting the texture information.

11 Claims, 5 Drawing Sheets

APPARATUS FOR ANALYZING IMAGE TEXTURE AND METHOD THEREFOR

BACKGROUND OF THE INVENTION

1. Field of the Invention

The present invention relates to an apparatus for analyzing image information, and more particularly, to an apparatus for analyzing texture information of an image and a method therefor.

2. Description of the Related Art

Texture information of a still image is important in classifying and detecting an image. The texture information is important in classifying objects after introducing in MPEG-4 in which an object-based compression is applied. Referring to FIG. 1, an apparatus for detecting texture information from an image receives a still image and performs filtering with a Garbor filtering unit. The Garbor filtering unit is comprised of filters having a predetermined coefficient value based on characteristic scales and orientations. For example, the Garbor filtering unit can be comprised of 24 filters by combining four scales and six orientations. Namely, an input image is filtered by 24 filters having different scale and orientation coefficient values. Therefore, 24 images filtered by a filter having different filtering coefficient values are obtained. A mean and variance calculator calculates mean and variance from the filtered 24 images. Such a mean and variance value shows a regulation in the image and can be used for analyzing the texture information of the image.

However, since the apparatus extracts the mean and variance from the filtered image, it can extract information on the degree of regulation the texture has; however, it cannot analyze the orientation and the periodicity of the texture in detail.

SUMMARY OF THE INVENTION

To solve the above problem, it is an objective of the present invention to provide an apparatus for analyzing image texture information by and able to analyze the orientation and periodicity of a texture in detail.

It is another object of the present invention to provide a method for analyzing image texture information by which it is possible to analyze the orientation and periodicity of a texture in detail.

Accordingly, to achieve the first objective, there is provided an apparatus for analyzing image texture information after receiving an image, comprising: a filtering unit for filtering a still image, comprised of a plurality of pixels of M rows×N columns, by using filters having different filtering coefficients, X axis projecting means for calculating a gray level mean value of a row of N pixels, for each row, with respect to the filtered plurality of images; and Y axis projecting means for calculating a gray level mean value of a column of M pixels, for each column, with respect to the filtered plurality of images.

It is preferable that the apparatus further comprises: graph generating means for generating graphs showing the trend of gray level mean values from the gray level mean values output from the X axis projecting means and from the Y axis projecting means, with respect to the plurality of filtered images; graph storing means for storing the graphs; and texture information analyzing means for analyzing the texture information of the image using the graphs.

The texture information analyzing means preferably analyzes the texture information of the image either using one characteristic of a group of characteristics comprised of the shape, the peak, and the periodicity of the graph, or the combination of the characteristics. The filtering unit is preferably a Garbor filter that includes filters constructed by combining different scale coefficients and different orientation coefficients.

To achieve the second objective, there is provided a method for analyzing image texture information after receiving an image, comprising: a step of reading a still image, comprised of pixels of M rows×N columns, a step of filtering the still image using filters having different filtering coefficients, and outputting a plurality of images, an X axis projecting step for calculating a gray level mean value of a row of N pixels, for each row, with respect to the filtered plurality of images; a Y axis projecting step for calculating a gray level mean value of a column of M pixels, for each column, with respect to the filtered plurality of images a step of generating graphs showing the change of gray level mean values, with respect to the plurality of filtered images from the gray level mean values obtained in the X and Y axes projection steps; a step of storing the graphs; and a texture information analyzing step of analyzing the texture information of an image using the graphs.

BRIEF DESCRIPTION OF THE DRAWING(S)

The above objectives and advantages of the present invention will become more apparent by describing in detail a preferred embodiment thereof with reference to the attached drawings in which.

DESCRIPTION OF THE PREFERRED EMBODIMENTS

Hereinafter, preferred embodiments of an apparatus for analyzing image texture information according to the present invention and a method therefor will be described in detail with reference to the attached drawings.

Figure 2:
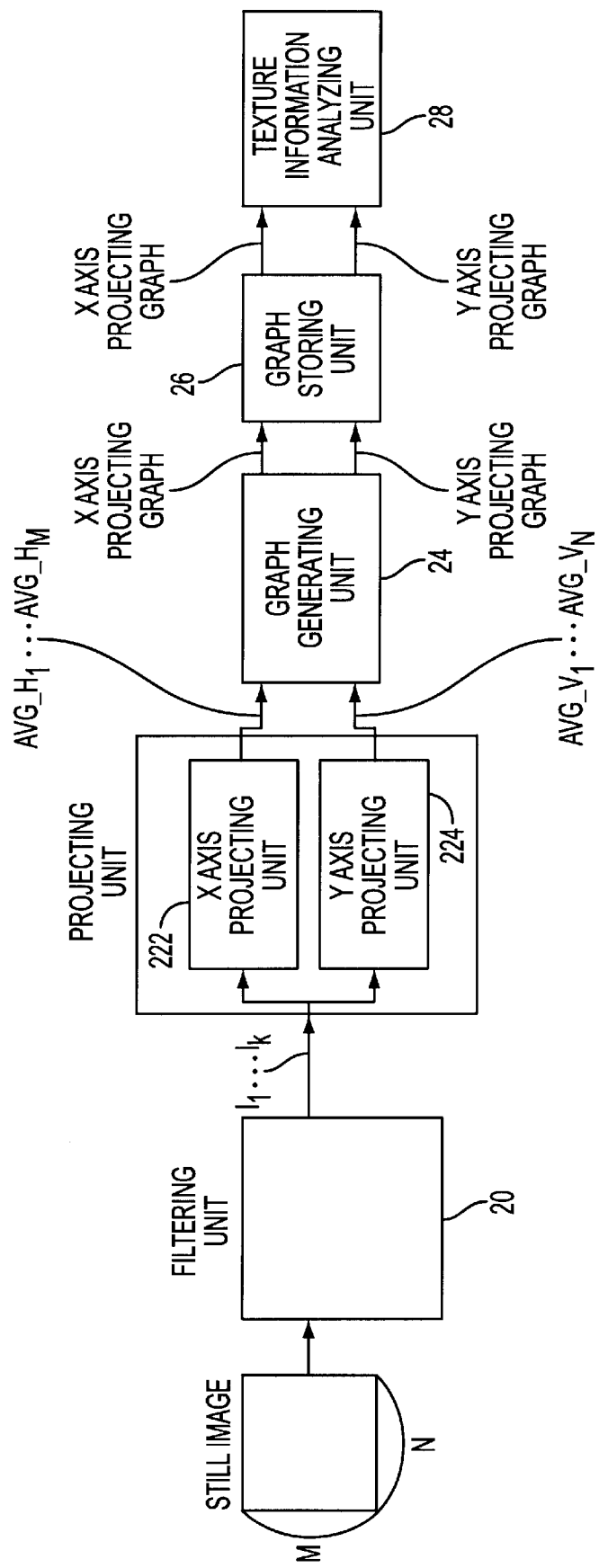
FIG. 2 is a block diagram showing the structure of an apparatus for analyzing image texture information according to an embodiment of the present invention.

FIG. 2 is a block diagram showing the structure of an apparatus for analyzing image texture information according to an embodiment of the present invention. Referring to FIG. 2, the apparatus for analyzing the image texture information includes a filtering unit 20 and a projecting unit 22. The projecting unit 22 comprises an X axis projecting unit 222 and a Y axis projecting unit 224.

The operation of the apparatus for analyzing the image texture information will now be described.

Figure 1:
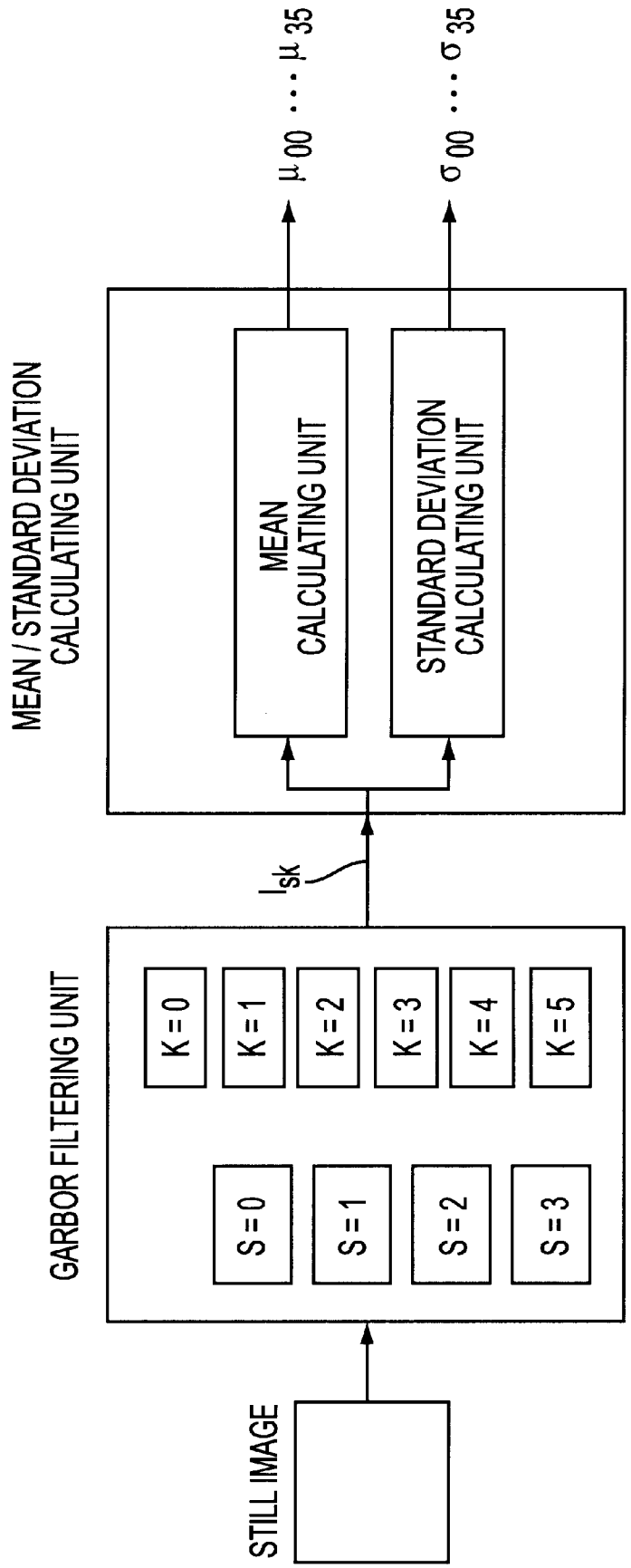
FIG. 1 is a block diagram showing the structure of a conventional apparatus for analyzing image texture information.

First, a still image comprised of N×M pixels is input to the filtering unit 20. A Garbor filter, including filters constructed by combining different scales and orientations as was described with reference to FIG. 1, or a similar filter, is preferably used as the filtering unit 20 so as to clearly distinguish an orientation and a periodicity of a filtered image. For example, when the combined number of filters used for filtering is K, filtered images $I_1$ to $I_K$ are output from the filtering unit. The output filtered image is comprised of the N×M pixels like the still image input to the filtering unit 20. The number of filtered images is equal to the combined number K of filters, with respect to the input image. Also, the filtering unit 20 can include only filters having different scale coefficient values or filters having different orientation coefficient values as is known to anyone skilled in the art. The variation of the filtering unit does not restrict the scope of the present invention defined by the attached claims.

Figure 3:
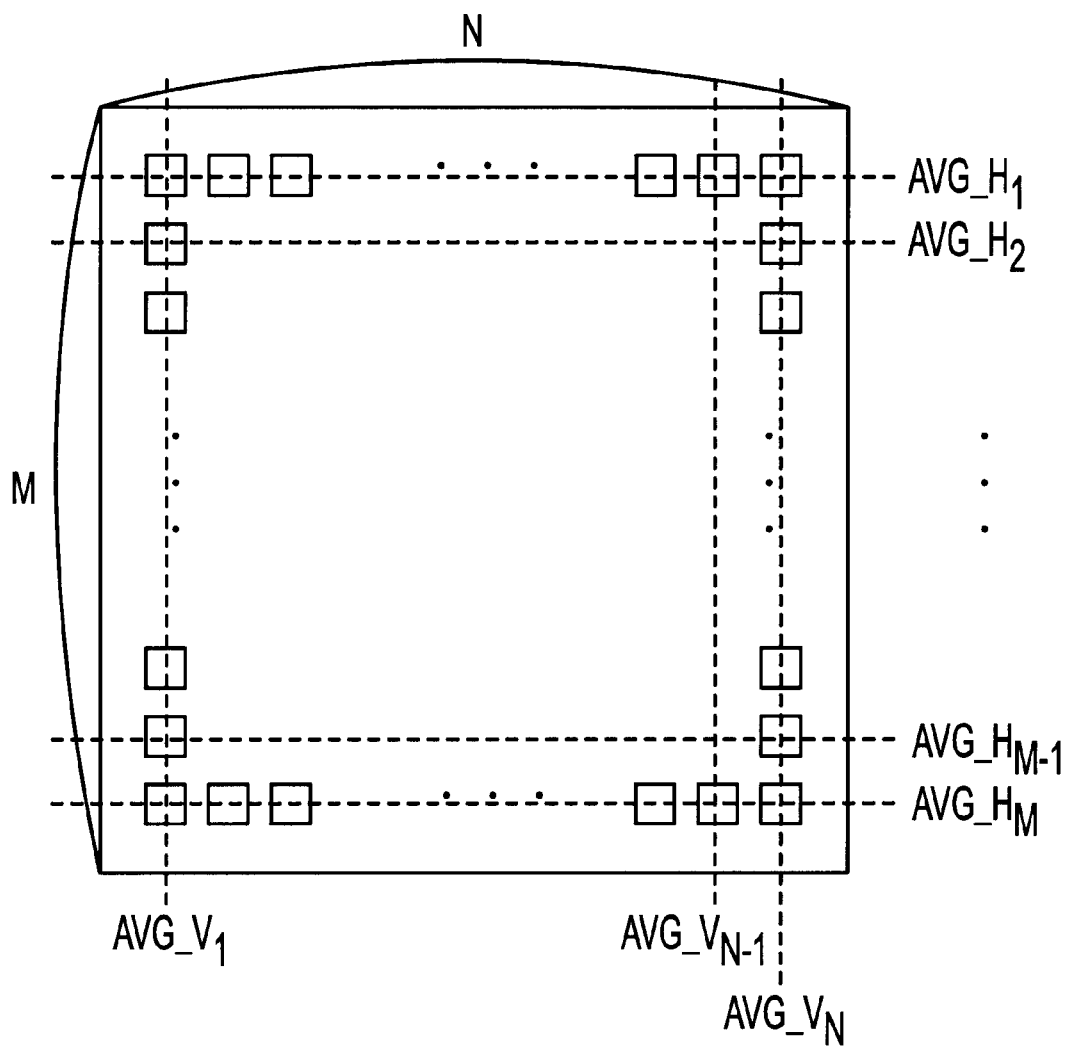
FIG. 3 shows processes of performing X and Y axes projections with respect to a still image comprised of M×N pixels.

The filtered images $I_1$ to $I_K$ are sequentially input to the projecting unit. The respective images are projected in the X axis projecting unit 222 and the Y axis projecting unit 224. FIG. 3 describes processes for performing X and Y axes projections with respect to a still image comprised of M×N pixels. The processes of performing the X and Y axes projections will be described with reference to FIGS. 2 and 3. First, processes of projecting a first image $I_1$, among the filtered images $I_1$ to $I_K$, will be described. The X axis projecting unit 222 receives the filtered image $I_1$ comprised of N×M pixels and calculates gray level mean values $AVG\_H_1$ to $AVG\_H_M$ of the N pixels in a row, for each row. Therefore, a gray level mean value $AVG\_H_1$ is obtained with respect to a first row, a gray level mean value $AVG\_H_2$ is obtained with respect to a second row, and a gray level mean value $AVG\_H_M$ is obtained with respect to an Mth row. Similar to this, the Y axis projecting unit 224 receives the filtered image $I_1$ comprised of the N×M pixels and calculates gray level mean values $AVG\_V_1$ to $AVG\_V_M$ of the M pixels in a column for each column. Therefore, a gray level mean value $AVG\_V_1$ is obtained with respect to a first column, a gray level mean value $AVG\_V_2$ is obtained with respect to a second column, and a gray level mean value $AVG\_V_N$ is obtained with respect to an Nth column.

Figure 4:
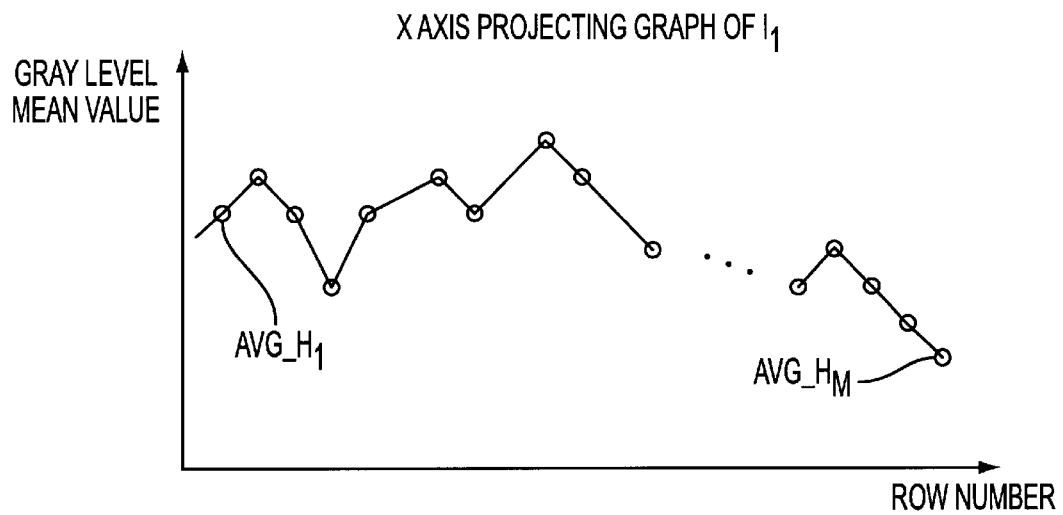
FIG. 4 is a graph showing the mean value of gray levels in rows as an example of the result of performing an X axis projection with respect to a still image.
Figure 5:
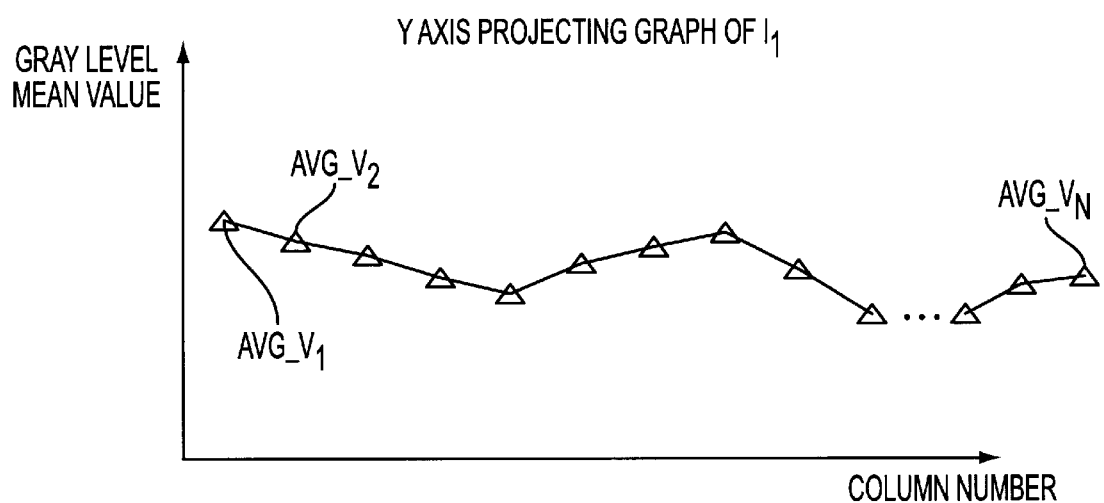
FIG. 5 is a graph showing a mean value of gray levels in columns as the example of the result of performing a Y axis projection with respect to the still image.

The graph generating unit 24 receives the gray level mean values $AVG\_H_1$ to $AVG\_H_M$ with respect to the X axis projection from the X axis projecting unit 222 and the gray level mean values $AVG\_V_1$ to $AVG\_V_M$ with respect to the Y axis projection from the Y axis projecting unit 224 and generates a graph showing the change of the gray level mean values with respect to each row and column. Namely, two graphs (the X axis projecting graph and the Y axis projecting graph) are generated with respect to one filtered image. FIGS. 4 and 5 show the gray level mean values with respect to rows and columns as graphs, an example of the result of performing the X and Y axes projections with respect to the still image. Since the filtered images, the number of which is equal to the combined number K of the filters with respect to one input image are output from the filtering unit 20, the graph generating means 24 generates 2×K projection graphs with respect to one image.

Figure 6:
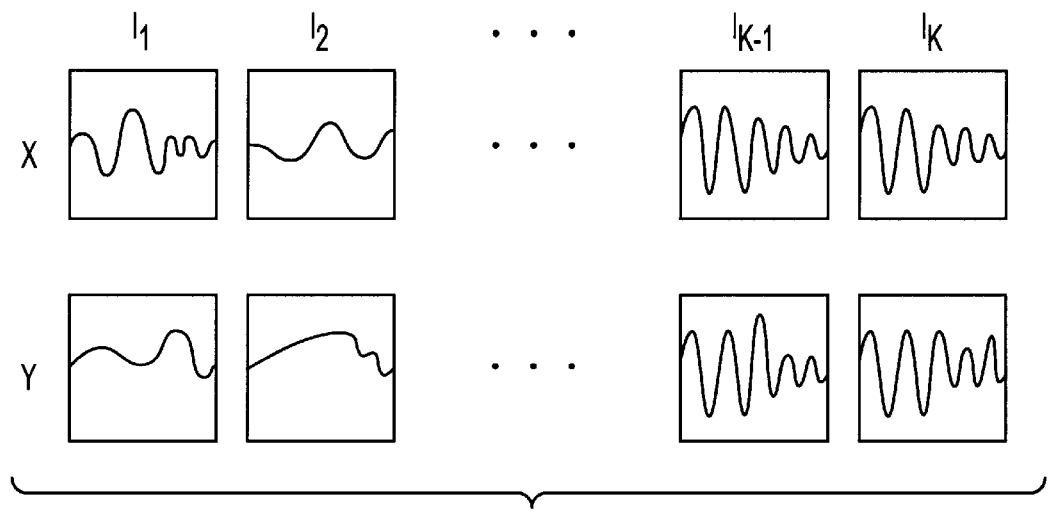
FIG. 6 shows examples of X and Y axes projection graphs with respect to still images.

The graph storing unit 26 stores the X axis projection graph and the Y axis projection graph that are output from the graph generating unit 24. FIG. 6 shows examples of the X and Y axes projection graphs with respect to each still image stored in the graph storing unit 26. Referring to FIG. 6, it is noted that 2×K projection graphs are stored with respect to one image.

The stored graphs have peculiarities corresponding to the characteristics of the filters used for filtering. A case in which a filtering unit 20 is the Garbor filter will be described. When an image comprised of lines having scales corresponding to a predetermined distance of a horizontal orientation, in the filtered image output from the filter having a horizontal orientation and a filtering coefficient corresponding to the predetermined distance, a peak corresponding to the predetermined distance is high. But, in a filter having a precisely vertical orientation, no peak is shown. As shown above, when the input image is matched to different filtering coefficients, characteristics including unique peaks, periodicity, or shape are shown on the projection graphs.

The texture information analyzing unit 28 analyses the texture information of the input image by analyzing such characteristics. The texture information analyzing unit 28 can analyze the texture information using one characteristic among the group of characteristics consisting of the shape, the peak, and the periodicity of the X and Y axes projecting graphs. However, it is preferable to analyze the texture information using a combination of the characteristics in order to obtain synthesized information.

Figure 7:
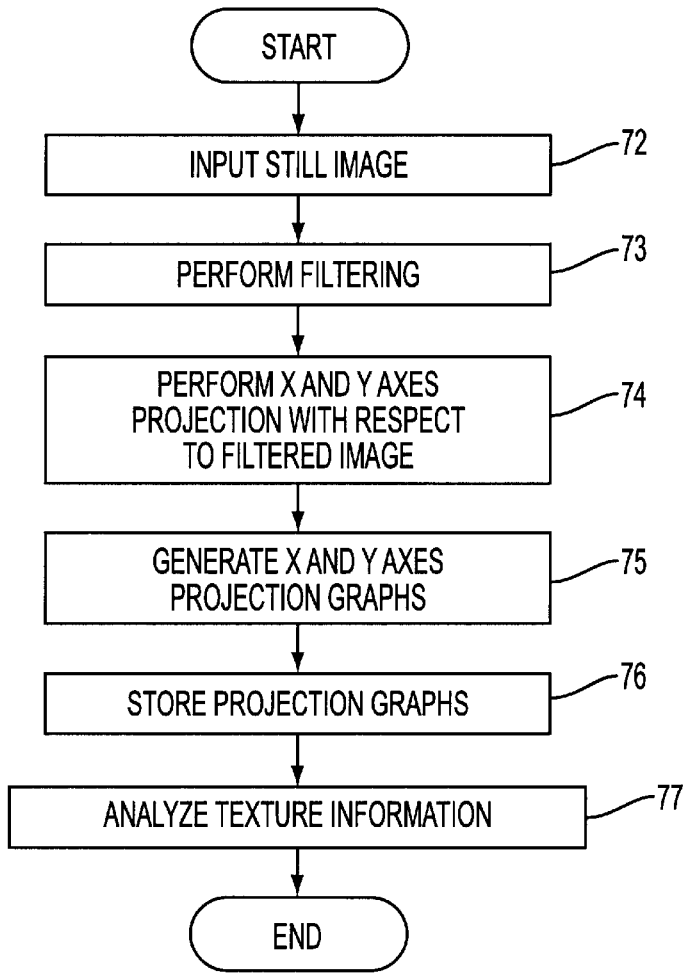
FIG. 7 is a flowchart showing the main steps of a method for analyzing image texture information according to an embodiment of the present invention.

FIG. 7 is a flowchart showing the main steps of a method for analyzing the image texture information according to an embodiment of the present invention and will now be described as follows. First, a still image comprised of M rows×N columns of pixels is read and filtered (step 73). Accordingly, a plurality of filtered images corresponding to the number of the filters having different filtering coefficients are obtained. For example, when the combined number of filters used for filtering is K, K filtered images are obtained. The X axis projection for calculating the gray level mean value of a row of N pixels, for each row, is performed with respect to each of the filtered plurality of images. The Y axis projection for calculating the gray level mean value of a column of M pixels, for each column, is performed with respect to each of the filtered image (step 74). Therefore, describing with reference to FIG. 2, the gray level mean value $AVG\_H_1$ is obtained with respect to the first row, the gray level mean value $AVG\_H_2$ is obtained with respect to the second row and the gray level mean value $AVG\_H_M$ is obtained with respect to the Mth row. Also, the gray level mean value $AVG\_V_1$ is obtained with respect to the first column, the gray level mean value $AVG\_V_2$ is obtained with respect to the second column. The gray level mean value $AVG\_V_N$ is obtained with respect to the Nth column.

Graphs showing the change of the gray level mean values from the gray level mean values obtained in the X and Y axes projecting steps are generated with respect the plurality of filtered images (step 75). Since the filtered images corresponding to the combined number K of the filters are obtained with respect to one input image in the filtering step 73, 2×K projecting graphs are generated with respect to one image in the graph generating step 75. The generated graphs are stored in a predetermined memory (step 76). The texture information of the image is analyzed using the graphs as mentioned above with reference to FIG. 2. (step 77).

The method and apparatus according to the present invention use graphs projected to X and Y axes, and do not use average and standard deviations of data information obtained by filtering, so that it is possible to describe the orientation and the periodicity of the texture. Therefore, it is possible to analyze the orientation and the periodicity of the texture in detail by analyzing the texture information using the projection graphs.

Also, the method for analyzing the image texture information according to the present invention can be written as a program which can be performed in a computer. The method can be realized in a general personal computer by loading the program from a medium used by a computer. Different mediums include a magnetic recording medium such as a floppy disk or a hard disk, an optical recording medium such as a CD-ROM or a DVD and a carrier wave such as the transmission through an Internet. Also, such functional programs, codes, and code segments can be easily estimated by a programmer of a technology field to which the present invention belongs to.

It is possible to describe the orientation and the periodicity of the texture in extracting the texture information according to the method for analyzing image texture according to the present invention and the apparatus therefor.

What is claimed is:

1. An apparatus for analyzing image texture information after receiving an image, comprising:
   a filtering unit for filtering a still image having a plurality of pixels of M rows×N columns with filters having different filtering coefficients, the filtering unit outputting a plurality of images;
   X axis projecting means for calculating a gray level mean value of a row of N pixels, for each row, for the filtered plurality of images; and
   Y axis projecting means for calculating a gray level mean value of a column of M pixels, for each column, for the filtered plurality of images.

2. An apparatus for analyzing image texture information after receiving an image, comprising:
   a filtering unit for filtering a still image having a plurality of pixels of M rows×N columns with filters having different filtering coefficients, the filtering unit outputting a plurality of images;
   X axis projecting means for calculating a gray level mean value of a row of N pixels, for each row, for the filtered plurality of images;
   Y axis projecting means for calculating a gray level mean value of a column of M pixels, for each column, for the filtered plurality of images;
   graph generating means for generating graphs showing a trend of gray level mean values from the gray level mean values output from the X axis projecting means and from the Y axis projecting means, for the plurality of filtered images;
   graph storing means for storing the graphs; and
   texture information analyzing means for analyzing texture information of the image using the graphs.

3. An apparatus as claimed in claim 2, wherein the texture information analyzing means analyses the texture information of the image using one characteristic of a group of characteristics comprised of the shape, the peak, and the periodicity of the graph or using a combination of the characteristics.

4. An apparatus as claimed in claim 3, wherein the filtering unit is a Garbor filter including filters constructed by combining different scale coefficients and different orientation coefficients.

5. A method for analyzing image texture information after receiving an image, comprising:
   a step of filtering the still image with filters having different filtering coefficients and outputting a plurality of images;
   an X axis projecting step for calculating a gray level mean value of a row of N pixels, for each row, for the filtered plurality of images;
   an Y axis projecting step for calculating a gray level mean value of a column of M pixels, for each column for the filtered plurality of images;
   a step of generating graphs showing a change of gray level mean values of the plurality of filtered images using the gray level mean values obtained in the X and Y axes projection steps;
   a step of storing the graphs; and
   a texture information analyzing step of analyzing the texture information of an image using the graphs.

6. A method as claimed in claim 5, wherein the texture information analyzing step includes a step of analyzing the texture information of an image using one characteristic of a group of characteristics consisting of the shape, the peak, and the periodicity of the graph or using a combination of the characteristics.

7. A method as claimed in claims 5 or 6, wherein the filtering step is performed by a Garbor filter including filters constructed by combining different scale coefficients and different orientation coefficients.

8. An apparatus for analyzing image texture information after receiving an image, comprising:
   a filtering unit comprising a plurality of filters having different filtering coefficients, the filtering unit being operative to filter a still image having a plurality of pixels of M rows×N columns and output a plurality of images;
   an X axis projecting unit operative to calculate a gray level mean value of a row of N pixels, for each row, for the filtered plurality of images; and
   an Y axis projecting unit operative to calculate a gray level mean value of a column of M pixels, for each column, for the filtered plurality of images.

9. An apparatus as claimed in claim 1, wherein the filtering unit is a Garbor filter including filters constructed by combining different scale coefficients and different orientation coefficients.

10. An apparatus as claimed in claim 8, wherein the filtering unit is a Garbor filter including filters constructed by combining different scale coefficients and different orientation coefficients.

11. A method for analyzing image texture information after receiving a still image, composing:
    filtering the still image with filters having different filtering coefficients, and generating a filtered plurality of images;
    calculating a gray level mean value of a row of N pixels, for a predetermined number of rows contained in the filtered plurality of images;
    calculating a gray level mean value of a column of M pixels, for a predetermined number of columns contained in the filtered plurality of images;
    generating graphs, showing a change of gray level mean values of the plurality of filtered images, using the gray level mean values;
    storing the graphs; and
    analyzing texture information of the still image using the graphs.

* * * * *